United States Patent
Wu et al.

(10) Patent No.: US 11,304,248 B2
(45) Date of Patent: *Apr. 12, 2022

(54) TRANSMISSION METHOD AND DEVICE FOR SIDELINK INFORMATION AND COMMUNICATION SYSTEM

(71) Applicant: FUJITSU LIMITED, Kawasaki (JP)

(72) Inventors: Lianhai Wu, Beijing (CN); Haibo Xu, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,087

(22) Filed: Feb. 12, 2020

(65) Prior Publication Data

US 2020/0178330 A1    Jun. 4, 2020

Related U.S. Application Data

(63) Continuation of application No. 15/810,986, filed on Nov. 13, 2017, now Pat. No. 10,624,141, which is a
(Continued)

(51) Int. Cl.
*H04W 76/14* (2018.01)
*H04W 4/06* (2009.01)
(Continued)

(52) U.S. Cl.
CPC ............ *H04W 76/14* (2018.02); *H04W 4/06* (2013.01); *H04W 8/005* (2013.01); *H04W 72/02* (2013.01); *H04W 72/0406* (2013.01); *H04W 88/04* (2013.01); *H04W 4/70* (2018.02); *H04W 48/10* (2013.01)

(58) Field of Classification Search
CPC ....... H04W 76/14; H04W 4/06; H04W 8/005; H04W 72/02; H04W 72/0406; H04W 88/04; H04W 4/70; H04W 48/10
See application file for complete search history.

(56) References Cited

U.S. PATENT DOCUMENTS

| 2014/0112158 A1 | 4/2014 | Tavildar et al. |
| 2014/0112162 A1 | 4/2014 | Tavildar et al. |

(Continued)

FOREIGN PATENT DOCUMENTS

| CN | 102469410 A | 5/2012 |
| CN | 102547881 A | 7/2012 |

(Continued)

OTHER PUBLICATIONS

International Search Report issued for corresponding International Patent Application No. PCT/CN2015/078966, dated Feb. 14, 2016, with an English translation.

(Continued)

*Primary Examiner* — Natasha W Cosme
(74) *Attorney, Agent, or Firm* — Myers Wolin, LLC.

(57) ABSTRACT

A relay user equipment (UE) including: a transmitter configured to transmit discovery information, the discovery information comprising a relay ID of the relay UE; and a receiver configured to receive from a base station control information that used to make a UE having an ability of relay become the relay UE, wherein, the condition information comprising an upper boundary value and a lower boundary value of air-interface channel quality of a primary serving cell of the UE.

10 Claims, 11 Drawing Sheets

Related U.S. Application Data continuation of application No. PCT/CN2015/078966, filed on May 14, 2015.

(51) Int. Cl.

| | | |
|---|---|---|
| *H04W 88/04* | (2009.01) | |
| *H04W 8/00* | (2009.01) | |
| *H04W 72/02* | (2009.01) | |
| *H04W 72/04* | (2009.01) | |
| *H04W 48/10* | (2009.01) | |
| *H04W 4/70* | (2018.01) | |

(56) References Cited

U.S. PATENT DOCUMENTS

| | | |
|---|---|---|
| 2014/0141777 A1 | 5/2014 | Guo |
| 2015/0031353 A1 | 1/2015 | Hakola et al. |
| 2016/0150390 A1 | 5/2016 | Chen et al. |
| 2018/0092017 A1 | 3/2018 | Freda et al. |

FOREIGN PATENT DOCUMENTS

| | | |
|---|---|---|
| CN | 103634812 A | 3/2014 |
| CN | 104105155 A | 10/2014 |
| CN | 104144521 A | 11/2014 |
| EP | 2 733 971 A1 | 5/2014 |
| EP | 2 833 694 A2 | 2/2015 |
| TW | 201427458 A | 7/2014 |
| WO | 2010/006649 A1 | 1/2010 |
| WO | 2014/051126 A1 | 4/2014 |

OTHER PUBLICATIONS

Written Opinion of the International Searching Authority issued for corresponding International Patent Application No. PCT/CN2015/078966, dated Feb. 14, 2016, with an English translation.

Non-Final Office Action issued by the United States Patent and Trademark Office for corresponding U.S. Appl. No. 15/810,986, dated Feb. 7, 2019.

Final Office Action issued by the United States Patent and Trademark Office for corresponding U.S. Appl. No. 15/810,986, dated Sep. 20, 2019.

Notice of Allowance issued by the United States Patent and Trademark Office for corresponding U.S. Appl. No. 15/810,986, dated Jan. 21, 2020.

First Office Action and search report issued by the China National Intellectual Property Administration for counterpart Chinese patent application No. 201580078829.6, dated May 19, 2020, along with the English translation.

ZTE, "Discussions on D2D UE-to-network Relay", Agenda Item: 7.2.3.2.1, 3GPP TSG-RAN WG1 Meeting #80bis, R1-151725, Belgrade, Serbia, Apr. 20-24, 2015.

Vice-Chair (InterDigital), "Report of the LTE break-out session (ProSe)", Agenda Item: 13.1.2, 3GPP TSG-RAN WG2 Meeting #89bis, R2-151722, Bratislava, Slovakia, Apr. 20-24, 2015.

Alcatel-Lucent Shanghai Bell et al., "Support out-of-coverage and partial coverage discovery", Agenda Item: 7.2.3.1.1, 3GPP TSG-RAN WG1 Meeting #80bis, R1-151327, Belgrade, Serbia, Apr. 20-24, 2015.

Second Notification of Office Action issued by the China National Intellectual Property Administration for corresponding Chinese Patent Application No. 201580078829.6, dated Oct. 16, 2020, with a full English translation.

401 a relay UE transmits discovery information; the discovery information at least including a relay ID of the relay UE, relay movement status information and sidelink carrier information

TRANSMISSION METHOD AND DEVICE FOR SIDELINK INFORMATION AND COMMUNICATION SYSTEM

CROSS REFERENCE TO RELATED APPLICATIONS

This application is a continuation of U.S. application Ser. No. 15/810,986, filed Nov. 13, 2017, now pending, which is a continuation application of International Application PCT/CN2015/078966 filed on May 14, 2015, the entire contents of each are incorporated herein by reference.

TECHNICAL FIELD

This disclosure relates to the field of communication technologies, and in particular to a transmission method and device for sidelink information and a communication system.

BACKGROUND

In recent years, wireless communication technologies have developed rapidly, 3GPP standardization develops to Rel. 13, and key technologies cover wide configuration of small cells, carrier aggregation (CA), a 3D multi-antenna technology (such as multiple input multiple output (MIMO)), and LTE enabling at an unlicensed band (such as licensed-assisted-access), etc.

A sidelink communication mode refers to that a data packet needs not to pass a core network and a base station, and a communication link may be directly established between user equipments (such as UE 1 and UE 2) for communication. A sidelink communication may also be referred to as a device to device (D2D) communication. And a sidelink discovery process is generally performed before performing sidelink communication. For example, UE 1 needs first to discover whether UE 2 is near before transmitting information to UE 2 in the sidelink communication mode.

FIG. 1 is a schematic diagram of the sidelink communication, in which a case where two UEs (UE 1 and UE 2) both under coverage of a base station (such as an eNB) perform sidelink discovery or establish sidelink communication is shown. FIG. 2 is another schematic diagram of the sidelink communication, in which a case where one UE (UE 1) under coverage of a base station and another UE (UE 2) not under the coverage of the base station perform sidelink discovery or establish sidelink communication is shown. And FIG. 3 is a further schematic diagram of the sidelink communication, in which a case where two UEs (UE 1 and UE 2) neither under coverage of a base station perform sidelink discovery or establish sidelink communication is shown.

The sidelink communication mode may be used to expand coverage of a cell. Two examples of expanding coverage shall be given below with reference to FIGS. 1 and 2.

Scenario 1: as shown in FIG. 1, a UE (UE 2) is located at an edge of a cell, and its signals are relatively weak, which is very possible to leave coverage of the cell. Furthermore, there exists a UE (such as UE 1) nearby which is authorized by a network and has a function of relay. And in order to avoid service interruption, UE 2 may access to a base station via a relay UE 1 after discovering the relay UE 1, and proceed with performing normal service communication.

Scenario 2: as shown in FIG. 2, a UE (such as UE 2) is located in an area with no network coverage, and there exists a UE (such as UE 1) nearby which is authorized by a network and has a function of relay. In order to access to a network for communication, UE 2 may access to a base station via a relay UE 1 after discovering the relay UE 1 within coverage of a cell.

In the above-described scenarios, UE 2 may be referred to as a remote UE, which may be located within the coverage of a cell, or may be located out of the coverage of the cell. And a UE having a function of relay (such as UE 1) may be referred to a relay UE, may be referred to as a UE-network relay, and may also be referred to as a relay.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in an existing system, information on a sidelink between a relay UE and a remote UE is not integrally defined, how a UE having a function of relay becomes a relay UE is not defined, nor how a remote UE performs relay discovery and sidelink discovery and triggers report are defined.

Embodiments of this disclosure provide a transmission method and device for sidelink information and a communication system, in which it is expected to achieve expansion of coverage of a cell via a relay UE.

According to a first aspect of the embodiments of this disclosure, there is provided a transmission method for sidelink information, applicable to a relay UE, the transmission method including:

transmitting discovery information by the relay UE, the discovery information at least including a relay ID of the relay UE, relay movement status information and sidelink carrier information.

According to a second aspect of the embodiments of this disclosure, there is provided a transmission device for sidelink information, configured in a relay UE, the transmission device including:

a discovery information transmitting unit configured to transmit discovery information, the discovery information at least comprising a relay ID of the relay UE, relay movement status information and sidelink carrier information.

According to a third aspect of the embodiments of this disclosure, there is provided a transmission method for sidelink information, applicable to a remote UE, the transmission method including:

receiving discovery information transmitted by a relay UE; the discovery information at least includes a relay ID of the relay UE, relay movement status information and sidelink carrier information.

According to a fourth aspect of the embodiments of this disclosure, there is provided a transmission device for sidelink information, configured in a remote UE, the transmission device including:

a discovery information receiving unit configured to receive discovery information transmitted by a relay UE; the discovery information at least includes a relay ID of the relay UE, relay movement status information and sidelink carrier information.

According to a fifth aspect of the embodiments of this disclosure, there is provided a transmission method for sidelink information, applicable to a base station, the transmission method including:

broadcasting one piece of the following information or any combination thereof by the base station: first condition information that makes a UE having an ability of relay become a relay UE, second condition information that makes a remote UE start to detect discovery information and perform sidelink measurement, and third condition information that makes the remote UE report a result of the sidelink measurement.

According to a sixth aspect of the embodiments of this disclosure, there is provided a transmission device for sidelink information, configured in a base station, the transmission device including:

a parameter transmitting unit configured to broadcast one piece of the following information or any combination thereof: first condition information that makes a UE having an ability of relay become a relay UE, second condition information that makes a remote UE start to detect discovery information and perform sidelink measurement, and third condition information that makes the remote UE report a result of the sidelink measurement.

According to a seventh aspect of the embodiments of this disclosure, there is provided a communication system, including:

a relay UE configured to transmit discovery information, the discovery information at least including a relay ID of the relay UE, relay movement status information and sidelink carrier information; and a remote UE configured to receive the discovery information transmitted by the relay UE.

According to another aspect of the embodiments of this disclosure, there is provided a computer readable program code, which, when executed in a base station, will cause a computer unit to carry out the transmission method for sidelink information as described above in the base station.

According to a further aspect of the embodiments of this disclosure, there is provided a computer readable medium, including a computer readable program code, which will cause a computer unit to carry out the transmission method for sidelink information as described above in a base station.

According to still another aspect of the embodiments of this disclosure, there is provided a computer readable program code, which, when executed in a UE, will cause a computer unit to carry out the transmission method for sidelink information as described above in the UE.

According to yet another aspect of the embodiments of this disclosure, there is provided a computer readable medium, including a computer readable program code, which will cause a computer unit to carry out the transmission method for sidelink information as described above in a UE.

An advantage of the embodiments of this disclosure exists in that by at least including a relay ID of the relay UE, relay movement status information and sidelink carrier information in the discovery information, the remote UE may perform relay discovery, and expansion of coverage of a cell may be achieved.

Furthermore, broadcasting the first condition information by the base station may make the UE having a function of relay become a relay UE when it satisfies the first condition, broadcasting the second condition information by the base station may make the remote UE start to monitor the discovery information and perform sidelink measurement when it satisfies the second condition, and broadcasting the third condition information by the base station may make the remote UE report a sidelink measurement result when it satisfies the third condition.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of this disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

Embodiment 1

Figures 4, 5:
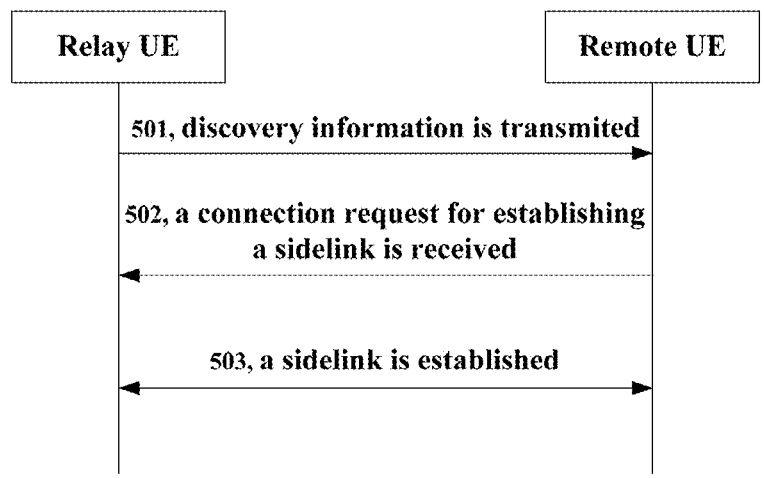
FIG. 4 is a flowchart of the transmission method for sidelink information of Embodiment 1 of this disclosure.
FIG. 5 is another flowchart of the transmission method for sidelink information of Embodiment 1 of this disclosure.

The embodiment of this disclosure provides a transmission method for sidelink information. FIG. 4 is a flowchart of the transmission method for sidelink information of this embodiment, which shall be described from a relay UE side.

As shown in FIG. 4, the transmission method includes:

block 401: a relay UE transmits discovery information, the discovery information at least including a relay ID of the relay UE, relay movement status information and sidelink carrier information.

In this embodiment, the relay UE may broadcast the discovery information. For example, the relay UE first is a UE having an ability of relay, that is, it pre-obtains authorization from a ProSe function entity and has a ProSe relay UE ID. Furthermore, the UE having an ability of relay may be determined to be a relay UE after it satisfies a predetermined condition.

In this embodiment, the relay movement status information is, for example, information indicating the relay UE is in a low-speed, or medium-speed, or high-speed status. A speed of a UE may be divided into multiple classes, which are indicated by the relay movement status information. The sidelink carrier information is carrier information indicating that the relay UE is used for a sidelink, such as information on a frequency point, and a bandwidth, etc. The sidelink carrier information may be indicated respectively according to a reception signal and a transmission signal, that is, it may be differentiated as ProSe reception carrier information and ProSe transmission carrier information.

In this embodiment, a remote UE may receive discovery information transmitted by one or more relay UEs, and then determine one relay UE on its own according to the discovery information and channel quality, and perform sidelink connection with the determined relay UE.

Figure 2:
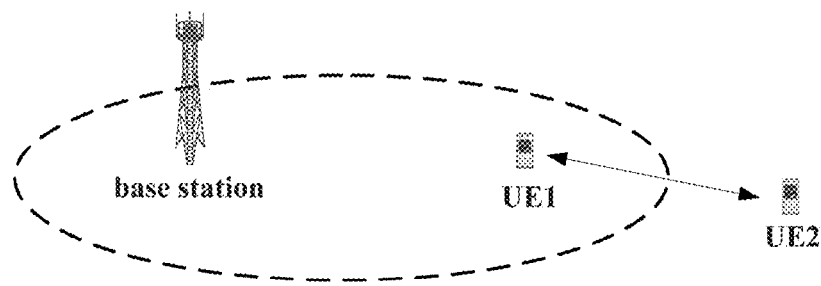
FIG. 2 is another schematic diagram of the sidelink communication.
Figure 3:
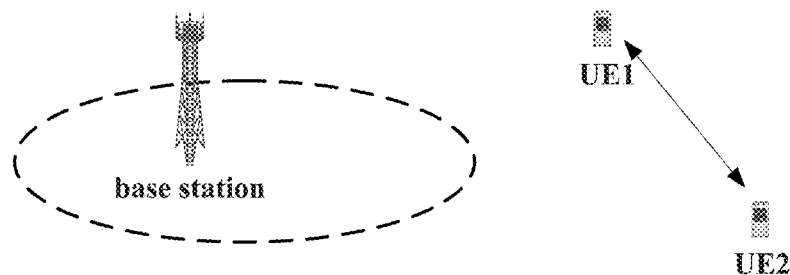
FIG. 3 is a further schematic diagram of the sidelink communication.

For example, in the scenario shown in FIG. 2, UE 2 may receive discovery information transmitted by multiple relay UEs, and then determine UE 1 (for example, UE 1 is at a low speed and is stable) therefrom for relay, thereby performing relay discovery and expanding coverage of the cell.

FIG. 5 is another flowchart of the transmission method for sidelink information of the embodiment of this disclosure. As shown in FIG. 5, a transmission method includes:

501: a relay UE transmits discovery information to a remote UE, the discovery information at least including a relay ID of the relay UE, relay movement status information and sidelink carrier information.

502: the relay UE receives a connection request for establishing a sidelink transmitted by the remote UE; and 503: the relay UE establishes a sidelink with the remote UE.

In this embodiment, a UE having an ability of relay may determine itself as a relay UE according to the predetermined condition, or may receive a first condition message broadcasted by a base station, and become a relay UE when it satisfies the first condition. For example, the first condition information may at least include an upper boundary value and a lower boundary value of air-interface channel quality, and/or movement status condition information.

Furthermore, the UE having an ability of relay may exchange with the base station via information before broadcasting the discovery information, such that the base station will make an acknowledgement that the UE becomes a real relay UE.

Figures 6, 7:
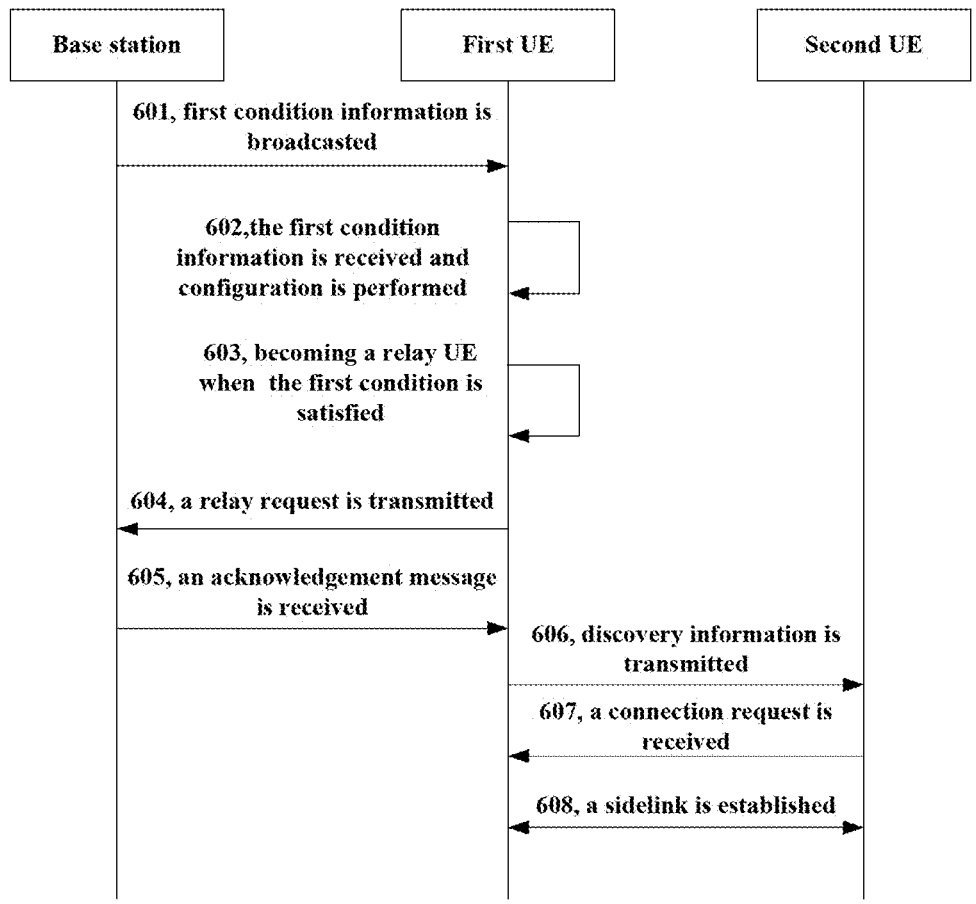
FIG. 6 is a further flowchart of the transmission method for sidelink information of Embodiment 1 of this disclosure.
FIG. 7 is a flowchart of the transmission method for sidelink information of Embodiment 2 of this disclosure.

FIG. 6 is a further flowchart of the transmission method for sidelink information of the embodiment of this disclosure. For example, a first UE has an ability of relay, and becomes a relay UE after being acknowledged by the base station; a second UE is a remote UE, and, for example, is located in a cell edge area, or is out of coverage of the cell.

As shown in FIG. 6, a transmission method includes:

601: a base station broadcasts first condition information that makes a UE having an ability of relay become a relay UE.

For example, the first condition information may contain only the upper boundary value and the lower boundary value of the air-interface channel quality, and may also contain only the movement status condition information, such as information permitting a low-speed UE to become a relay UE, or information not permitting a high-speed UE to become a relay UE; furthermore, it may contain the above information, i.e. the upper boundary value and the lower boundary value of the air-interface channel quality and the movement status condition information, at the same time; however, this disclosure is not limited thereto, and particular information may be determined according to an actual situation.

602: the first UE receives the first condition information and performs corresponding parameter configuration.

603: the first UE becomes a relay UE when it satisfies the first condition.

In this embodiment, the first UE is determined as the relay UE when air-interface channel quality of the first UE is less than or equal to the upper boundary value and is greater than or equal to the lower boundary value, and/or when a movement status of the first UE satisfies the movement status condition information;

for example, when it is expected that the first UE becomes the relay UE, a measurement value of channel quality of its primary serving cell needs to be less than the upper boundary value and greater than the lower boundary value, that is, the first UE may possibly not be located at a central area of the cell; the measurement value of channel quality may be, for example, reference signal received power (RSRP), or reference signal received quality (RSRQ), or other measurement values capable of reflecting channel quality;

furthermore, the movement status of the UE may be divided into a low speed, a medium speed, and a high speed; and if the broadcasted information only permits a low-speed UE and a medium-speed UE to become a relay UE, a high-speed UE will not become a relay UE.

604: the first UE transmits a relay request for becoming the relay UE to the base station; the relay request at least includes the relay ID and the sidelink carrier information.

605: the first UE receives an acknowledgement message of becoming the relay UE transmitted by the base station.

For example, according to the received ProSe Relay UE ID, the base station may correspond ProSe Relay UE IDs one by one to other UE IDs such as cell radio network temporary identifiers (C-RNTIs), and sidelink radio network temporary identifiers (SL-RNTIs), etc., that is, the base station side may maintain a list of correspondence between ProSe Relay UE IDs and C-RNTIs or SL-RNTIs.

606: the first UE broadcasts discovery information, the discovery information at least including a relay ID of the relay UE, relay movement status information and sidelink carrier information.

607: the second UE transmits a connection request for establishing a sidelink after receiving the discovery information;

for example, in a case where the second UE receives multiple pieces of discovery information, it may determine on its own a relay UE performing relay (for example, the first UE may be determined to perform relay), and transmits a connection request for establishing a sidelink to the relay UE.

608: the first UE establishes a sidelink with the second UE after receiving the connection request.

It should be noted that the relay UE side is illustrated above. Embodiment 2 may be referred to for description of the remote UE side, in which the embodiment of this disclosure may be applicable to the scenario shown in FIG. 1, and may also be applicable to the scenario shown in FIG. 2. Furthermore, the above process is illustrative only, and this disclosure is not limited thereto. For example, an order of executing steps may be adjusted according to an actual situation, and one more steps therein may be deleted according to an actual situation.

It can be seen from the above embodiment that by at least including a relay ID of the relay UE, relay movement status information and sidelink carrier information in the discovery information, the remote UE may perform relay discovery, and expansion of coverage of a cell may be achieved.

Embodiment 2

The embodiment of this disclosure provides a transmission method for sidelink information, which shall be described on the basis of Embodiment 1, with contents identical to those in Embodiment 1 being not going to be described herein any further.

FIG. 7 is a flowchart of the transmission method for sidelink information of this embodiment, which shall be described from a remote UE side. As shown in FIG. 7, a transmission method includes:

step 701: discovery information transmitted by a relay UE is received; the discovery information at least includes a relay ID of the relay UE, relay movement status information and sidelink carrier information.

In this embodiment, the remote UE may determine on its own the time when the receiving of the discovery information begins, and may also receive second condition information broadcasted by a base station, and start to receive the discovery information when it satisfies the second condition. For example, the second condition information may include a first threshold value of channel quality of a primary serving cell of the remote UE, or, a second threshold value of channel quality of the primary serving cell and a third threshold value of channel quality of a neighboring cell.

Figure 8:
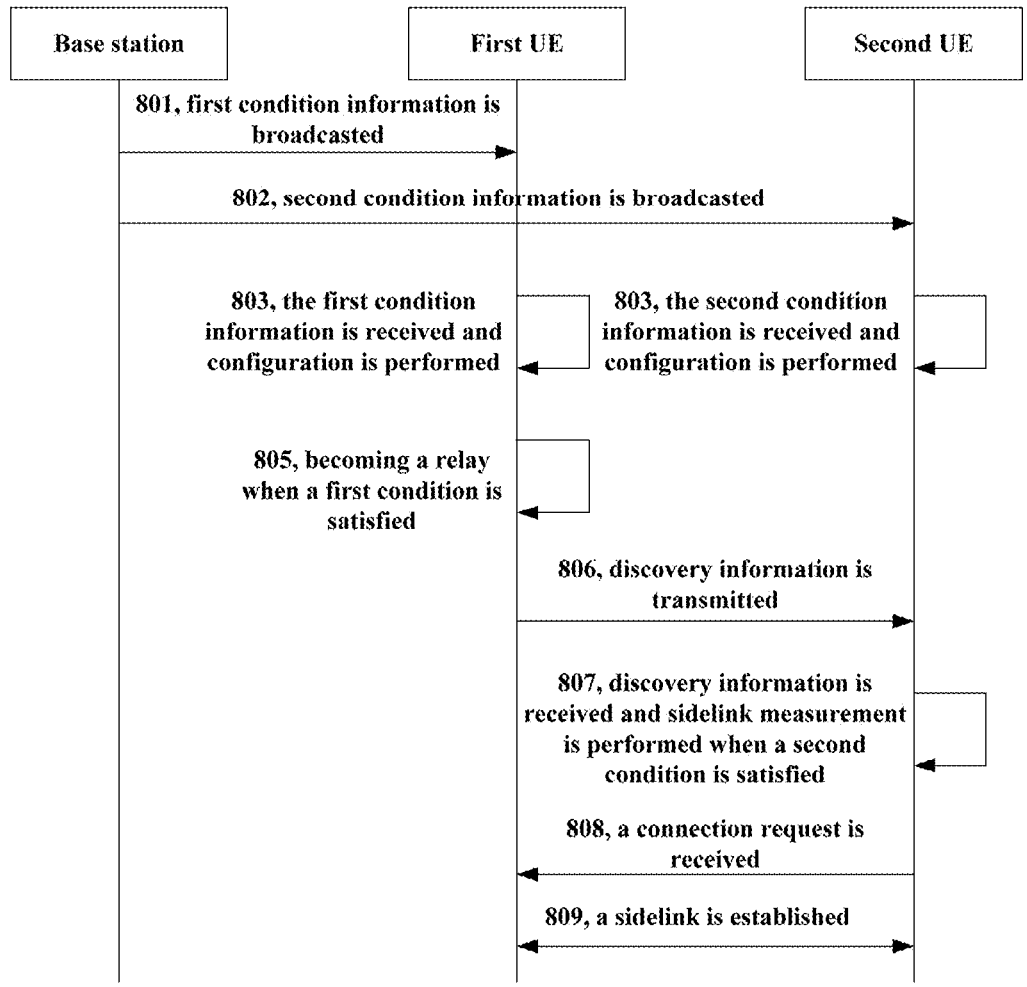
FIG. 8 is another flowchart of the transmission method for sidelink information of Embodiment 2 of this disclosure.

FIG. 8 is another flowchart of the transmission method for sidelink information of the embodiment of this disclosure. For example, a first UE has an ability of relay, and becomes a relay UE after satisfying the first condition; a second UE is a remote UE, and starts to receive the discovery information and performs sidelink measurement after satisfying the second condition.

As shown in FIG. 8, a transmission method includes:

801: a base station broadcasts first condition information.

802: the base station broadcasts the second condition information making the remote UE start to detect the discovery information and perform sidelink measurement.

803: the first UE receives the first condition information and performs corresponding parameter configuration.

804: the second UE receives the second condition information and performs corresponding parameter configuration.

805: the first UE becomes a relay UE when it satisfies the first condition.

Figure 1:
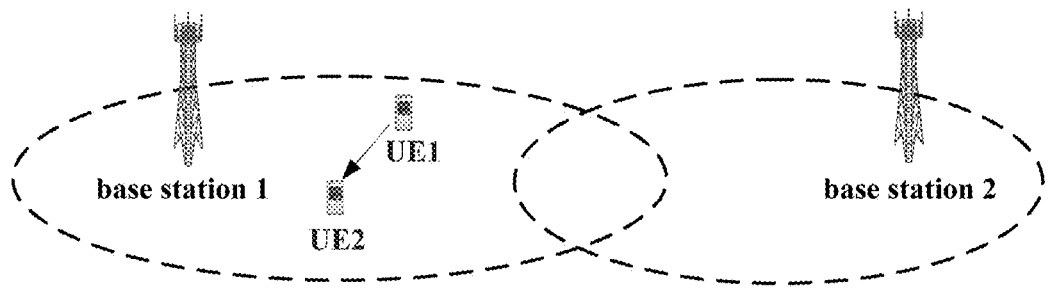
FIG. 1 is a schematic diagram of sidelink communication.

806: the first UE broadcasts discovery information, the discovery information at least including a relay ID of the relay UE, relay movement status information and sidelink carrier information;

for example, in the scenario shown in FIG. 1, UE 1 starts to broadcast the discovery information when it satisfies the first condition.

807: the second UE receives the discovery information and performs sidelink measurement when it satisfies the second condition.

In an implementation, the second UE starts to receive the discovery information transmitted by the first UE and performs the sidelink measurement in a case where the channel quality of the primary serving cell of the second UE is smaller than or equal to the first threshold value;

for example, in the scenario shown in FIG. 1, UE 2 moves to an edge area of the primary serving cell gradually, and the channel quality of the primary serving cell of UE 2 becomes poor and poor; and when the channel quality of the primary serving cell of UE 2 is smaller than or equal to the first threshold value, UE 2 starts to receive the discovery information transmitted by UE 1 and performs the sidelink measurement.

In another implementation, the second UE starts to receive the discovery information transmitted by the first UE and performs the sidelink measurement in a case where the channel quality of the primary serving cell of the second UE is smaller than or equal to the second threshold value and the channel quality of all neighboring cells of the second UE is smaller than or equal to the third threshold value;

for example, in the scenario shown in FIG. 1, UE 2 moves to an edge area of the primary serving cell gradually, and the channel quality of the primary serving cell of UE 2 becomes poor and poor, while the channel quality of all neighboring cells of UE 2 may possibly still not be good enough; and when the channel quality of the primary serving cell of UE 2 is smaller than or equal to the second threshold value and the channel quality of all neighboring cells is smaller than or equal to the third threshold value, UE 2 starts to receive the discovery information transmitted by UE 1 and performs the sidelink measurement.

808: the second UE transmits a connection request for establishing a sidelink to a relay UE after the second UE selects the relay UE according to a measurement result;

for example, in a case where the second UE receives multiple pieces of discovery information, it may determine on its own a relay UE performing relay (for example, the first UE may be determined to perform relay), and transmits a connection request for establishing a sidelink to the relay UE.

809: the first UE establishes a sidelink with the second UE after receiving the connection request.

In this embodiment, the remote UE may determine on its own the relay UE, or the base station may determine the relay UE for the remote UE. And furthermore, the remote UE may measure channel quality of sidelink(s) between it and one or more relay UEs, and report one or more measurement results to the base station.

In this embodiment, the remote UE may determine on its own the time for reporting the measurement results, and may also receive third condition information broadcasted by the base station and report the measurement results when it satisfies the third condition. For example, the third condition information may include a fourth threshold value of channel quality of the primary serving cell and a fifth threshold value of channel quality of the neighboring cell.

Figure 9:
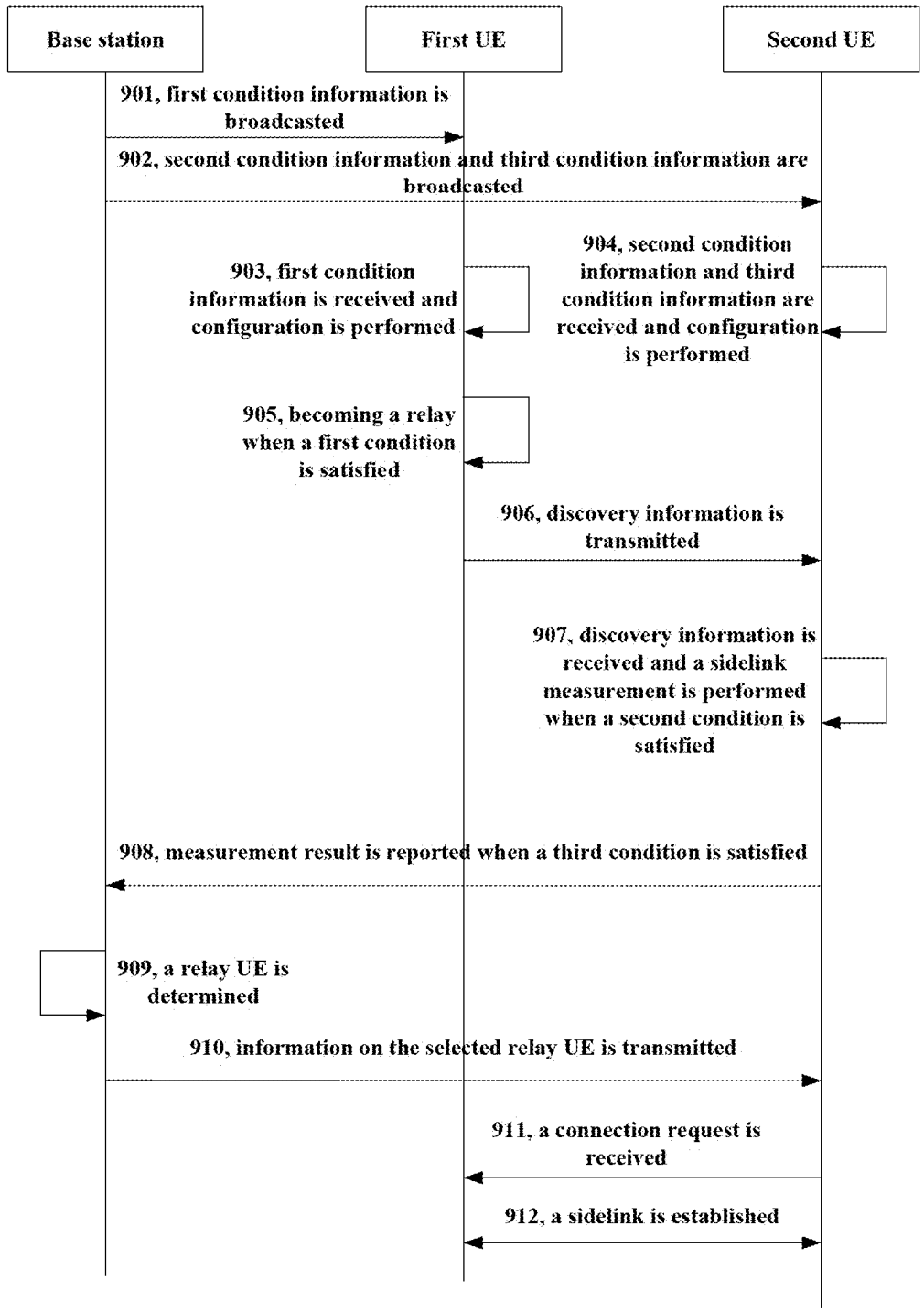
FIG. 9 is a further flowchart of the transmission method for sidelink information of Embodiment 2 of this disclosure.

FIG. 9 is a further flowchart of the transmission method for sidelink information of the embodiment of this disclosure. For example, a first UE has an ability of relay, and becomes a relay UE after satisfying the first condition; a second UE is a remote UE, and starts to receive the discovery information and performs sidelink measurement after satisfying the second condition, and reports measurement results after satisfying the third condition.

As shown in FIG. 9, a transmission method includes:

901: a base station broadcasts first condition information.

902: the base station broadcasts the second condition information and third condition information making the remote UE report a sidelink measurement result.

903: the first UE receives the first condition information and performs corresponding parameter configuration.

904: the second UE receives the second condition information and performs corresponding parameter configuration.

905: the first UE becomes a relay UE when it satisfies the first condition.

906: the first UE broadcasts discovery information, the discovery information at least including a relay ID of the relay UE, relay movement status information and sidelink carrier information.

907: the second UE starts to receive the discovery information and performs sidelink measurement when it satisfies the second condition;

in this embodiment, the remote UE may receive discovery information transmitted by one or more relay UEs; and for each piece of discovery information, the remote UE may measure channel quality of a sidelink with the relay UE transmitting the discovery information, thereby obtaining one or more measurement results.

908: the second UE reports a measurement result when it satisfies the third condition;

for example, measurement results of channel quality of a sidelink between the second UE and the first UE as well as a relay ID of the first UE may be reported to the base station, in a case where the channel quality of the primary serving cell of the second UE is smaller than or equal to the fourth threshold value and the channel quality of all neighboring cells is smaller than or equal to the fifth threshold value;

in this embodiment, when the remote UE reports the measurement results, other auxiliary information advantageous to selecting the relay UE by the base station, such as the relay movement status information of the relay UE, load level information, and sidelink carrier information, may also be reported;

in this embodiment, the remote UE may possibly measure channel quality of sidelinks with multiple relay UEs and obtain multiple measurement results, and may only report part of the measurement results; for example, in the reported measurement results, a value of the channel quality is larger than or equal to a sixth threshold value, and/or, the number of the measurement results is smaller than or equal to a seventh threshold value;

in this embodiment, the first to the seventh threshold values may be configured by the base station via a broadcast message or specific radio resource control (RRC) signaling; and furthermore, one or more of the first to the seventh threshold values may be configured by the base station, or may be determined in advance; particular numeral values of the threshold values may be determined according to an actual scenario, and this disclosure is not limited thereto.

909: the base station selects a relay UE for the second UE.

910: the base station transmits information on the selected relay UE to the second UE;

in this embodiment, the base station may select a suitable relay UE for the remote UE according to the reported measurement results and with reference to other information (such as loads of the relay UEs), such as determining that the first UE provides relay services for the second UE, and then transmits information on the relay UE to the remote UE.

911: the second UE transmits a connection request for establishing a sidelink to the selected first UE; and 912: the first UE establishes a sidelink with the second UE after receiving the connection request.

In this embodiment, the relay UE may acknowledge connection establishment via a sidelink response after receiving the connection request from the remote UE. And after receiving the acknowledgement of connection establishment from the relay UE, the remote UE may transmit air-interface release information to the base station, and the base station may release configuration of the remote UE.

It should be noted that the remote UE side is illustrated above. Embodiment 1 may be referred to for description of the relay UE side. Furthermore, the above process is illustrative only, and this disclosure is not limited thereto. For example, an order of executing steps may be adjusted according to an actual situation, and one more steps therein may be deleted according to an actual situation.

Furthermore, FIG. 6 shows a case where the first condition information is broadcasted, FIG. 8 shows a case where the first condition information and the second condition information are broadcasted, and FIG. 9 shows a case where the first condition information, the second condition information and the third condition information are broadcasted; however, this disclosure is not limited thereto. And the condition information in the embodiment of this disclosure is independent from each other. For example, the second condition information or the third condition information may only be broadcasted, and the corresponding subsequent steps may be adjusted accordingly. And one piece of the first condition information, the second condition information and the third condition information or any combination thereof may be used according to an actual scenario.

It can be seen from the above embodiment that by at least including a relay ID of the relay UE, relay movement status information and sidelink carrier information in the discovery information, the remote UE may perform relay discovery, and expansion of coverage of a cell may be achieved.

Embodiment 3

The embodiment of this disclosure provides a transmission method for sidelink information, which shall be described on the basis of embodiments 1 and 2, with contents identical to those in embodiments 1 and 2 being not going to be described herein any further.

Figures 10, 11:
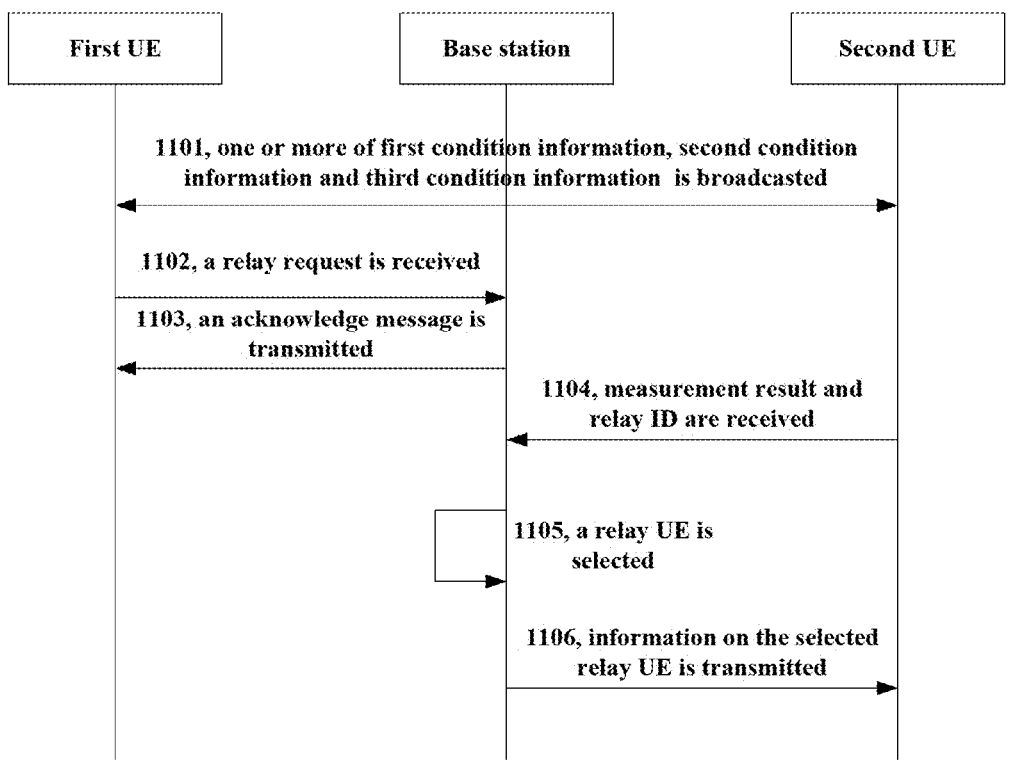
FIG. 10 is a flowchart of the transmission method for sidelink information of Embodiment 3 of this disclosure.
FIG. 11 is another flowchart of the transmission method for sidelink information of Embodiment 3 of this disclosure.

FIG. 10 is a flowchart of the transmission method for sidelink information of this embodiment, which shall be described from a base station side. As shown in FIG. 10, a transmission method includes:

block 1001: a base station broadcasts one piece of the following information or any combination thereof: first condition information that makes a UE having an ability of relay become a relay UE, second condition information that makes a remote UE start to detect discovery information and perform sidelink measurement, and third condition information that makes the remote UE report a result of the sidelink measurement.

FIG. 11 is another flowchart of the transmission method for sidelink information of the embodiment of this disclosure. For example, a first UE has an ability of relay, and becomes a relay UE after satisfying the first condition; a second UE is a remote UE, and starts to receive the discovery information and performs sidelink measurement after satisfying the second condition, and reports measurement results after satisfying the third condition.

As shown in FIG. 11, a transmission method includes:

1101: a base station broadcasts one piece of the following information or any combination thereof: first condition information that makes a UE having an ability of relay become a relay UE, second condition information that makes a remote UE start to detect discovery information and perform sidelink measurement, and third condition information that makes the remote UE report a result of the sidelink measurement.

1102: the base station receives a relay request for becoming the relay UE transmitted by the first UE; the relay request at least includes a relay ID of the UE, relay movement status information and sidelink carrier information.

1103: the base station transmits an acknowledgement message of becoming a relay UE to the first UE.

1104: the base station receives a measurement result of channel quality of a sidelink between the second UE and the first UE that is reported by the second UE as well as the relay ID of the first UE.

1105: the base station selects a relay UE for the second UE; and

1106: the base station transmits information on the selected relay UE to the second UE.

It should be noted that only exchange related to the base station side is illustrated above. Embodiments 1 and 2 may be referred to for description of the relay UE side and the remote UE side. Furthermore, the above process is illustrative only, and this disclosure is not limited thereto. For example, an order of executing steps may be adjusted according to an actual situation, and one more steps therein may be deleted according to an actual situation.

In this embodiment, the base station side may maintain a list of correspondence between ProSe Relay UE IDs and C-RNTIs or SL-RNTIs. And information in the list may be obtained in one or more of the following ways:

transmitting request information containing a ProSe Relay UE ID by the remote UE to the base station in applying for becoming a relay UE;

transmitting information containing a ProSe Relay UE ID directly by the remote UE to the base station when the remote UE receives the first condition information transmitted by the base station and satisfies the first condition, so that the base station learns that the UE is interested in becoming a relay UE. The information may be contained in a SidelinkUEInformation IE or a new IE.

It can be seen from the above embodiment that by at least including a relay ID of the relay UE, relay movement status information and sidelink carrier information in the discovery information, the remote UE may perform relay discovery, and expansion of coverage of a cell may be achieved.

Furthermore, by broadcasting the first condition information by the base station, the UE having an ability of relay may be made to become a relay UE when it satisfies the first condition, by broadcasting the second condition information by the base station, the remote UE may be made to start to detect the discovery information and perform the sidelink measurement when it satisfies the second condition, and by broadcasting the third condition information by the base station, the remote UE may be made to report the sidelink measurement results when it satisfies the third condition.

Embodiment 4

The embodiment of this disclosure provides a transmission device for sidelink information, configured in a UE having an ability of relay or a relay UE. The embodiment of this disclosure corresponds to the transmission method for sidelink information in Embodiment 1, with identical contents being not going to be described herein any further.

Figure 12:
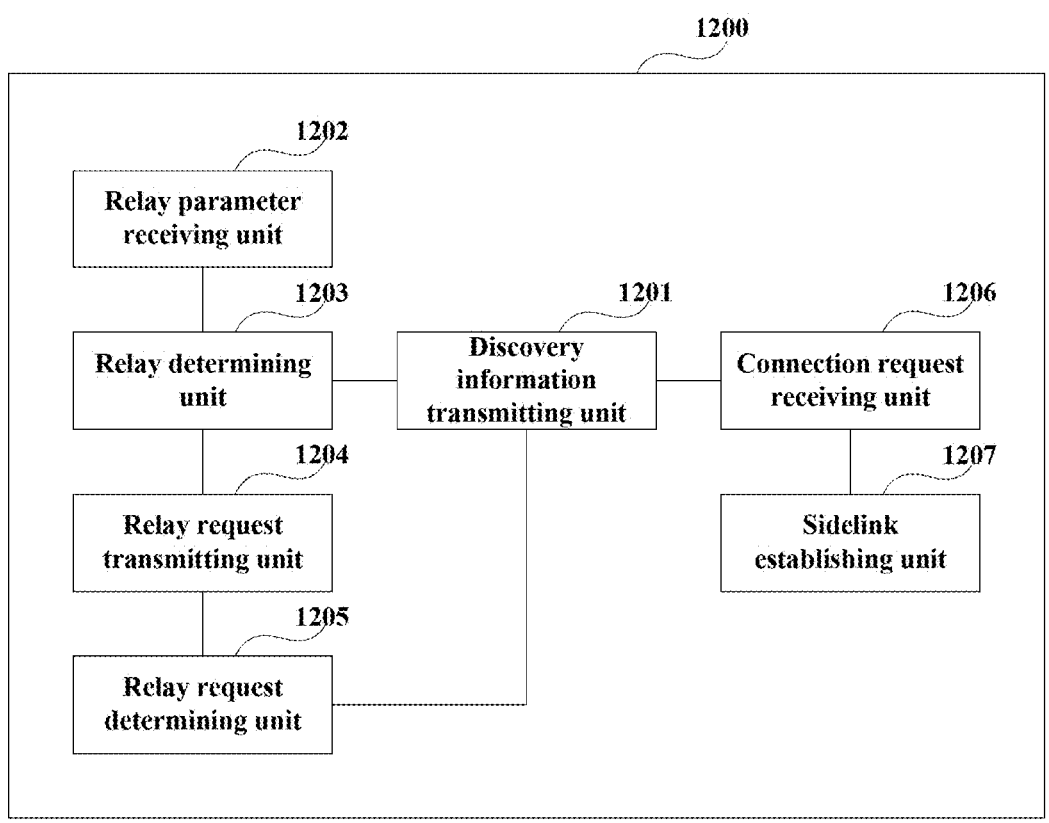
FIG. 12 is a schematic diagram of the transmission device for sidelink information of Embodiment 4 of this disclosure.

FIG. 12 is a schematic diagram of the transmission device for sidelink information of the embodiment of this disclosure. As shown in FIG. 12, a transmission device 1200 includes:

a discovery information transmitting unit 1201 configured to transmit discovery information, the discovery information at least including a relay ID of the relay UE, relay movement status information and sidelink carrier information.

As shown in FIG. 12, a transmission device 1200 may further include:

a relay parameter receiving unit 1202 configured to receive first condition information that is broadcasted by a base station and used to make a UE having an ability of relay become the relay UE; the first condition information at least includes an upper boundary value and a lower boundary value of air-interface channel quality, and/or movement status condition information.

As shown in FIG. 12, the transmission device 1200 may further include:

a relay determining unit 1203 configured to determine that the UE becomes the relay UE in a case where the air-interface channel quality of the UE is smaller than or equal to the upper boundary value and is larger than or equal to the lower boundary value, and/or in a case where the movement status of the UE satisfies the movement status condition information.

As shown in FIG. 12, the transmission device 1200 may further include:

a relay request transmitting unit 1204 configured to transmit a relay request for becoming the relay UE to the base station; the relay request at least includes the relay ID, the relay movement status information and the sidelink carrier information; and a relay request acknowledging unit 1205 configured to receive an acknowledgement message of becoming the relay UE transmitted by the base station.

As shown in FIG. 12, the transmission device 1200 may further include:

a connection request receiving unit 1206 configured to receive a connection request for establishing a sidelink transmitted by a remote UE; and a sidelink establishing unit 1207 configured to establish a sidelink with the remote UE.

It should be noted that the transmission device 1200 does not need to include all of the above units or modules, one or more units or modules thereof may only be configured or used, and particular configuration may be determined according to an actual scenario.

The embodiment of this disclosure further provides a UE, configured with the above transmission device 1200.

Figure 13:
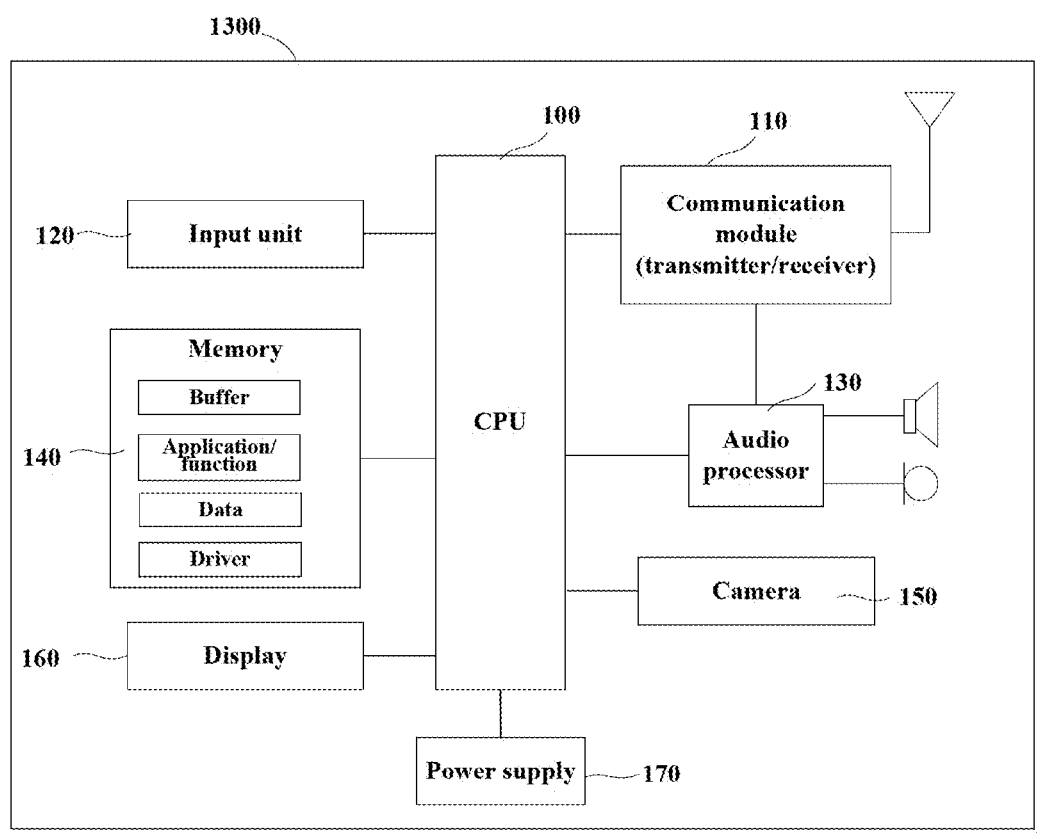
FIG. 13 is a schematic diagram of the UE of Embodiment 4 of this disclosure.

FIG. 13 is a schematic diagram of the UE of the embodiment of this disclosure. As shown in FIG. 13, the UE 1300 may include a central processing unit 100 and a memory 140, the memory 140 being coupled to the central processing unit 100. It should be noted that this figure is illustrative only, and other types of structures may also be used, so as to supplement or replace this structure and achieve a telecommunications function or other functions.

In an implementation, the functions of the transmission device 1200 may be integrated into the central processing unit 100. The central processing unit 100 may be configured to perform following control: transmitting discovery information, the discovery information at least including a relay ID of the UE, relay movement status information and sidelink carrier information.

In another implementation, the transmission device 1200 and the central processing unit 100 may be configured separately. For example, the transmission device 1200 may be configured as a chip connected to the central processing unit 100, with its functions being realized under control of the central processing unit 100.

As shown in FIG. 13, the UE 1300 may further include a communication module 110, an input unit 120, an audio processor 130, a memory 140, a camera 150, a display 160 and a power supply 170. Functions of the above components are similar to those in the relevant art, and shall not be described herein any further. It should be noted that the UE 1300 does not necessarily include all the parts shown in FIG. 13, and furthermore, the UE 1300 may include parts not shown in FIG. 13, and the relevant art may be referred to.

It can be seen from the above embodiment that by at least including a relay ID of the relay UE, relay movement status information and sidelink carrier information in the discovery information, the remote UE may perform relay discovery, and expansion of coverage of a cell may be achieved.

Embodiment 5

The embodiment of this disclosure provides a transmission device for sidelink information, configured in a remote UE. The embodiment of this disclosure corresponds to the transmission method for sidelink information in Embodiment 2, with identical contents being not going to be described herein any further.

Figure 14:
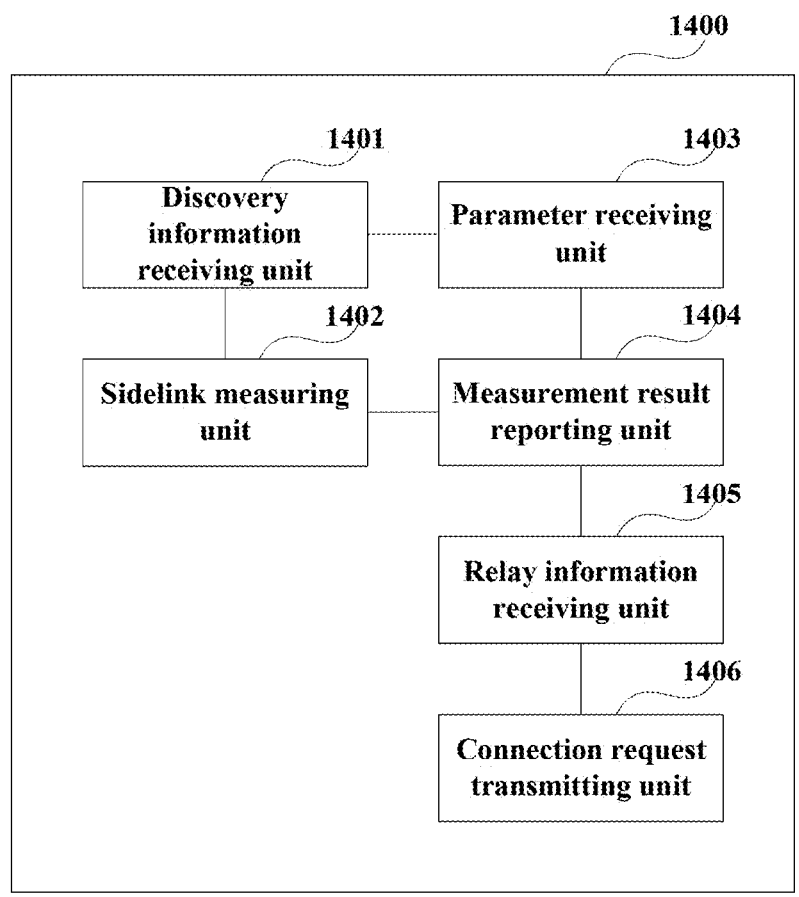
FIG. 14 is a schematic diagram of the transmission device for sidelink information of Embodiment 5 of this disclosure.

FIG. 14 is a schematic diagram of the transmission device for sidelink information of the embodiment of this disclosure. As shown in FIG. 14, a transmission device 1400 includes:

a discovery information receiving unit 1401 configured to receive discovery information transmitted by a relay UE; the discovery information at least includes a relay ID of the relay UE, relay movement status information and sidelink carrier information; and a sidelink measuring unit 1402 configured to measure channel quality of a sidelink between the remote UE and the relay UE.

As shown in FIG. 14, the transmission device 1400 may further include:

a parameter receiving unit 1403 configured to receive second condition information broadcasted by a base station and used to make the remote UE start to detect the discovery information and perform sidelink measurement, and/or third condition information that makes the remote UE report a result of the sidelink measurement.

For example, the second condition information may include a first threshold value of channel quality of a primary serving cell, or, a second threshold value of channel quality of the primary serving cell and a third threshold value of channel quality of a neighboring cell; and the third condition information may include a fourth threshold value of channel quality of the primary serving cell and a fifth threshold value of channel quality of the neighboring cell.

In this embodiment, the discovery information receiving unit 1401 may further be configured to start to receive the discovery information transmitted by the relay UE in a case where the channel quality of the primary serving cell of the remote UE is smaller than or equal to the first threshold value, or in a case where the channel quality of the primary serving cell of the remote UE is smaller than or equal to the second threshold value and the channel quality of all neighboring cells is smaller than or equal to the third threshold value.

As shown in FIG. 14, the transmission device 1400 may further include:

a measurement result reporting unit 1404 configured to report measurement results of channel quality of a sidelink between the remote UE and the relay UE as well as a relay ID of the relay UE to the base station in a case where the channel quality of the primary serving cell of the remote UE is smaller than or equal to the fourth threshold value and the channel quality of all neighboring cells is smaller than or equal to the fifth threshold value.

In an implementation, the measurement result reporting unit 1404 is further configured to report one piece of the following information or any combination thereof: the relay movement status information of the relay UE, load level information and sidelink carrier information.

In an implementation, in the measurement results reported by the measurement result reporting unit 1404, a value of the channel quality is larger than or equal to a sixth threshold value, and/or, the number of the measurement results is smaller than or equal to a seventh threshold value.

As shown in FIG. 14, the transmission device 1400 may further include:

a relay information receiving unit 1405 configured to receive information on a relay UE selected by the base station for the remote UE; and a connection request transmitting unit 1406 configured to transmit a connection request for establishing a sidelink to the selected relay UE.

It should be noted that the transmission device 1400 does not need to include all of the above units or modules, one or more units or modules thereof may only be configured or used, and particular configuration may be determined according to an actual scenario.

The embodiment of this disclosure further provides a UE, configured with the above transmission device 1400. A structure of the UE may be as shown in FIG. 13.

It can be seen from the above embodiment that by at least including a relay ID of the relay UE, relay movement status information and sidelink carrier information in the discovery information, the remote UE may perform relay discovery, and expansion of coverage of a cell may be achieved.

Embodiment 6

The embodiment of this disclosure provides a transmission device for sidelink information, configured in a base station. The embodiment of this disclosure corresponds to the transmission method for sidelink information in Embodiment 3, with identical contents being not going to be described herein any further.

Figure 15:
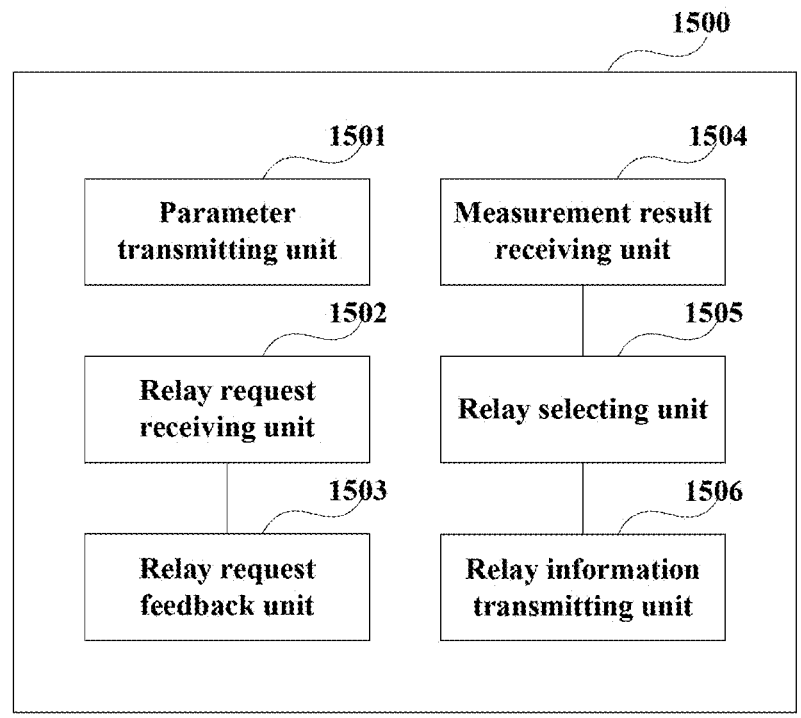
FIG. 15 is a schematic diagram of the transmission device for sidelink information of Embodiment 6 of this disclosure.

FIG. 15 is a schematic diagram of the transmission device for sidelink information of the embodiment of this disclosure. As shown in FIG. 15, a transmission device 1500 includes:

a parameter transmitting unit 1501 configured to broadcast one piece of the following information or any combination thereof: first condition information that makes a UE having an ability of relay become a relay UE, second condition information that makes a remote UE start to detect discovery information and perform sidelink measurement, and third condition information that makes the remote UE report a result of the sidelink measurement.

As shown in FIG. 15, the transmission device 1500 may further include:

a relay request receiving unit 1502 configured to receive a relay request for becoming the relay UE transmitted by the UE; the relay request at least includes a relay ID of the UE, relay movement status information and sidelink carrier information; and a relay request feedback unit 1503 configured to transmit an acknowledgement message of becoming a relay UE to the UE.

As shown in FIG. 15, the transmission device 1500 may further include:

a measurement result receiving unit 1504 configured to receive a measurement result of channel quality of a sidelink between the remote UE and the relay UE that is reported by the remote UE as well as the relay ID of the relay UE.

As shown in FIG. 15, the transmission device 1500 may further include:

a relay selecting unit 1505 configured to select a relay UE for the remote UE; and a relay information transmitting unit 1506 configured to transmit information on the selected relay UE to the remote UE.

It should be noted that the transmission device 1500 does not need to include all of the above units or modules, one or more units or modules thereof may only be configured or used, and particular configuration may be determined according to an actual scenario.

The embodiment of this disclosure further provides a base station, configured with the above transmission device 1500.

Figure 16:
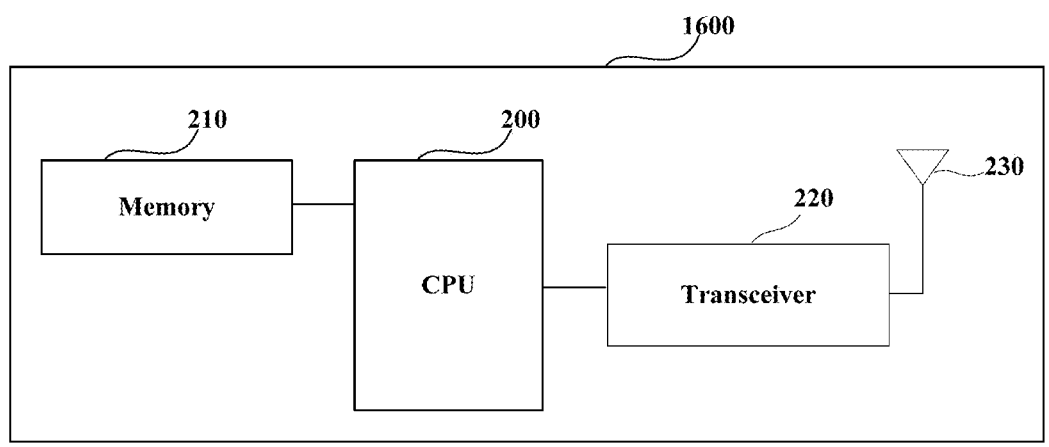
FIG. 16 is a schematic diagram of the base station of Embodiment 6 of this disclosure.

FIG. 16 is a schematic diagram of the base station of the embodiment of this disclosure. As shown in FIG. 16, the base station 1600 may include a central processing unit (CPU) 200 and a memory 210, the memory 210 being coupled to the central processing unit 200. The memory 210 may store various data, and furthermore, it may store a program for information processing, and execute the program under control of the central processing unit 200.

For example, the base station 1600 may carry out the transmission method for sidelink information described in Embodiment 3. And the central processing unit 200 may be configured to carry out the functions of the transmission device 1500, that is, the central processing unit 200 may be configured to perform the following control: broadcasting one piece of the following information or any combination thereof: first condition information that makes a UE having an ability of relay become a relay UE, second condition information that makes a remote UE start to detect discovery information and perform sidelink measurement, and third condition information that makes the remote UE report a result of the sidelink measurement.

Furthermore, as shown in FIG. 16, the base station 1600 may include a transceiver 220, and an antenna 230, etc. Functions of the above components are similar to those in the relevant art, and shall not be described herein any further. It should be noted that the base station 1600 does not necessarily include all the parts shown in FIG. 16, and furthermore, the base station 1600 may include parts not shown in FIG. 16, and the relevant art may be referred to.

It can be seen from the above embodiment that by at least including a relay ID of the relay UE, relay movement status information and sidelink carrier information in the discovery information, the remote UE may perform relay discovery, and expansion of coverage of a cell may be achieved.

Furthermore, by broadcasting the first condition information by the base station, the UE having an ability of relay may be made to become a relay UE when it satisfies the first condition, by broadcasting the second condition information by the base station, the remote UE may be made to start to detect the discovery information and perform the sidelink measurement when it satisfies the second condition, and by broadcasting the third condition information by the base station, the remote UE may be made to report the sidelink measurement results when it satisfies the third condition.

Embodiment 7

Figure 17:
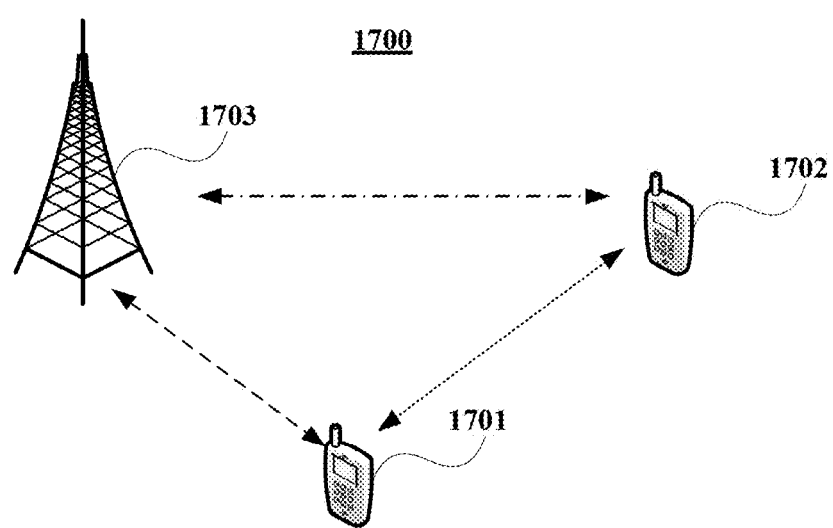
FIG. 17 is a schematic diagram of the communication system of Embodiment 7 of this disclosure.

The embodiment of this disclosure provides a communication system, with contents identical to those in embodiments 1-6 being not going to be described herein any further. FIG. 17 is a schematic diagram of the communication system of the embodiment of this disclosure. As shown in FIG. 17, the communication system 1700 includes: a relay UE 1701 and a remote UE 1702.

The relay UE 1701 is configured to transmit discovery information, the discovery information at least including a relay ID of the relay UE, relay movement status information and sidelink carrier information; and the remote UE 1702 is configured to receive the discovery information transmitted by the relay UE 1701.

As shown in FIG. 17, the communication system 1700 may further include:

a base station 1703 configured to broadcast one piece of the following information or any combination thereof: first condition information that makes a UE having an ability of relay become the relay UE, second condition information that makes the remote UE start to detect discovery information and perform sidelink measurement, and third condition information that makes the remote UE report a result of the sidelink measurement.

An embodiment of the present disclosure provides a computer readable program code, which, when executed in a UE, will cause a computer unit to carry out the transmission method for sidelink information described in Embodiment 1 or 2 in the UE.

An embodiment of the present disclosure provides a computer readable medium, including a computer readable program code, which will cause a computer unit to carry out the transmission method for sidelink information described in Embodiment 1 or 2 in a UE.

An embodiment of the present disclosure provides a computer readable program code, which, when executed in a base station, will cause a computer unit to carry out the transmission method for sidelink information described in Embodiment 3 in the base station.

An embodiment of the present disclosure provides a computer readable medium, including a computer readable program code, which will cause a computer unit to carry out the transmission method for sidelink information described in Embodiment 3 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. A relay user equipment (UE) comprising:
    a transmitter configured to transmit discovery information, the discovery information comprising a relay ID of the relay UE; and
    a receiver configured to receive from a base station control information that is used to make a UE having an ability of relay become the relay UE, wherein the control information comprising an upper boundary value and a lower boundary value of air-interface channel quality of a primary serving cell of the UE, wherein the receiver receives the control information that is broadcast by the base station.

2. The relay UE according to claim 1, wherein the transmitter transmits discovery information with broadcast.

3. The relay UE according to claim 1, wherein the discovery information including sidelink carrier information.

4. The relay UE according to claim 1, wherein the transmitter transmits to a remote user equipment (UE) the discovery information.

5. The relay UE according to claim 4, wherein the receiver receives a connection request from the remote UE.

6. The relay UE according to claim 5, further comprising a controller configured to establish a sidelink with the remote UE after receiving the connection request.

7. The relay UE according to claim 1, wherein the transmitter transmits to the base station a request message for becoming the relay UE.

8. A base station comprising:
    a processer configured to generate a control information; and
    a transmitter configured to transmit the control information that makes a User Equipment (UE) having an ability of relay become a relay UE, wherein the control information comprises an upper boundary value and a lower boundary value of air-interface channel quality of a primary serving cell of the UE, wherein the transmitter transmits the control information with a broadcast.

9. The base station according to claim 8, further comprising a receiver configured to receive from the UE a request message for becoming the relay UE.

10. A communication system, comprising:
    a relay User Equipment (UE) configured to transmit discovery information including a relay ID of the relay UE, and to receive control information used to make a UE having an ability of relay become the relay UE, the control information including an upper boundary value and a lower boundary value of air-interface channel quality;
    a remote UE configured to receive the discovery information transmitted by the relay UE; and
    a base station configured to transmit the control information, wherein the base station transmits the control information with a broadcast.

* * * * *